United States Patent
Brunstrom et al.

(10) Patent No.: US 7,428,427 B2
(45) Date of Patent: Sep. 23, 2008

(54) IMF COVER FOR A PORTABLE ELECTRONIC DEVICE

(75) Inventors: Leif Brunstrom, Jarfalla (SE); Sven Pettersson, Hasselby (SE); Stefan Munther, Bromma (SE)

(73) Assignee: Sony Ericsson Mobile Communications AB (SE)

( * ) Notice: Subject to any disclaimer, the term of this patent is extended or adjusted under 35 U.S.C. 154(b) by 381 days.

(21) Appl. No.: 11/265,054

(22) Filed: Nov. 2, 2005

(65) Prior Publication Data

US 2007/0099650 A1 May 3, 2007

(51) Int. Cl.
*H04M 1/00* (2006.01)
(52) U.S. Cl. ............... 455/550.1; 455/575.8; 455/567; 455/575.1
(58) Field of Classification Search ............. 455/575.8, 455/558.1, 550.1, 567, 575.1; 134/564; 235/472.01
See application file for complete search history.

(56) References Cited

U.S. PATENT DOCUMENTS

| | | |
|---|---|---|
| 5,386,084 A | 1/1995 | Risko |
| 6,990,361 B2 * | 1/2006 | Lutche et al. ............... 455/567 |
| 7,133,707 B1 * | 11/2006 | Rak et al. ................. 455/575.1 |
| 7,306,157 B2 * | 12/2007 | Barthelet et al. ........ 235/472.01 |

FOREIGN PATENT DOCUMENTS

| | | |
|---|---|---|
| DE | 100 29 678 A1 | 2/2001 |
| EP | 0 932 288 A1 | 7/1999 |
| WO | WO 01/69804 | 9/2001 |

\* cited by examiner

*Primary Examiner*—David Q Nguyen
(74) *Attorney, Agent, or Firm*—Myers Bigel Sibley & Sajovec, P.A.

(57) ABSTRACT

The present invention is directed towards a front cover for a portable electronic device as well as a portable electronic device including such a front cover. The front cover comprises a bottom layer of stiff plastic material having a first opening where at least one input key is to be provided, and a top layer of flexible plastic film that covers the bottom layer including said first opening. These two layers are furthermore bonded to each other. In this way a keypad is provided where dirt cannot enter between keys. The mounting process for the device is furthermore much simplified. It is furthermore possible to produce a waterproof keypad.

20 Claims, 1 Drawing Sheet

IMF COVER FOR A PORTABLE ELECTRONIC DEVICE

TECHNICAL FIELD OF THE INVENTION

The present invention relates to the field of portable electronic devices and more particularly towards a front cover for a portable electronic device as well as a portable electronic device provided with a front cover.

BACKGROUND OF THE INVENTION

It is known to provide so-called IMF (In Mould Foil) or IML for covers of portable electronic devices. IMF is a structure where a stiff plastic material has been bonded to a flexible plastic film through moulding. The IMF technique allows the provision of a cover where it is easy to provide graphics on the cover.

Portable electronic devices are furthermore provided with keys, which normally are provided in a keypad. These keys traditionally go through holes in the cover and then normally influence a dome or some other similar structure in order to provide key inputs.

Dirt can however enter the hole between the key and the cover and then negatively influence the functioning of the key. If the device is accidentally dropped in water, water may furthermore enter these holes and damage the phone. The keys may furthermore be fairly expensive to produce and mount. It is therefore of interest to provide keys for a portable electronic device in an alternative way than what is traditionally done.

SUMMARY OF THE INVENTION

The present invention is therefore directed towards providing an alternative key solution for a portable electronic device.

This is generally solved by using a top layer of flexible plastic film that has been bonded to and covers a bottom layer of stiff plastic material to form a keypad area.

One object of an embodiment of the present invention is thus directed towards providing a front cover for a portable electronic device that provides an alternative key solution for the portable electronic device.

According to a first aspect of the present invention, this object may be achieved by a front cover for a portable electronic device comprising:
  a bottom layer of stiff plastic material comprising a first opening where at least one input key is to be provided, and
  a top layer of flexible plastic material, said top layer covering said bottom layer including said first opening,
  wherein the two layers are bonded to each other.

A second aspect of the present invention includes the features of the first aspect, wherein the top layer has a thickness in the range of 0.05-0.25 mm, preferably in the range of 0.07-0.20 mm and particularly 0.175 mm.

A third aspect of the present invention includes the features of the first aspect, wherein the bottom layer has a thickness in the range of 0.5-2.0 mm, preferably in the range of 1.0-1.5 mm and particularly 1.2 mm.

A fourth aspect of the present invention includes the features of the first aspect, further comprising a patch layer of flexible thermo elastic or silicon material in said opening adjacent the top layer, which thermo elastic or silicon material is bonded at least to the top layer.

A fifth aspect of the present invention includes the features of the fourth aspect, wherein the patch layer has a thickness in the range of 0.3-1.0 mm, preferably in the range of 0.4-0.9 and particularly 0.4 mm.

A sixth aspect of the present invention includes the features of the fourth aspect, wherein the patch layer comprises protrusions extending in a direction away from the top layer.

A seventh aspect of the present invention includes the features of the first aspect, wherein all layers have been moulded to each other.

An eighth aspect of the present invention includes the features of the first aspect, wherein the bottom layer comprises a second opening where a display is to be provided and the top layer covers also said second opening.

Another object of an embodiment of the present invention is to provide a portable electronic device that provides an alternative key solution.

According to a ninth aspect of the present invention, this object may be achieved by a portable electronic device with a front cover, said front cover comprising:
  a bottom layer of stiff plastic material comprising a first opening where at least one key is to be provided, and
  a top layer of flexible plastic material, said top layer covering said bottom layer including said first opening,
  wherein the two layers are bonded to each other A tenth aspect of the present invention includes the features of the ninth aspect, wherein the top layer has a thickness the range of 0.05-0.25 mm, preferably in the range of 0.07-0.20 mm and particularly 0.175 mm.

An eleventh aspect of the present invention includes the features of the ninth aspect, wherein the bottom layer has a thickness in the range of 0.5-2.0 mm, preferably in the range of 1.0-1.5 mm and particularly 1.2 mm.

A twelfth aspect of the present invention includes the features of the ninth aspect, further comprising a patch layer of flexible thermo elastic or silicon material in said opening adjacent the top layer, which thermo elastic or silicon material is bonded at least to the top layer.

A thirteenth aspect of the present invention includes the features of the twelfth aspect, wherein the patch layer has a thickness in the range of 0.3-1.0 mm, preferably in the range of 0.4 and 0.9 and particularly 0.4 mm.

A fourteenth aspect of the present invention includes the features of the twelfth aspect, wherein the patch layer comprises protrusions extending in a direction away from the top layer.

A fifteenth aspect of the present invention includes the features of the ninth aspect, wherein all layers have been moulded to each other.

A sixteenth aspect of the present invention includes the features of the ninth aspect, wherein the bottom layer comprises a second opening where a display is to be provided and the top layer covers also said second opening.

A seventeenth aspect of the present invention includes the features of the ninth aspect, wherein it is a portable communication device.

An eighteenth nineteenth aspect of the present invention includes the features of the seventeenth aspect, wherein it is a cellular phone.

The present invention may provide many advantages. It may allow the provision of keys of a keypad on a solid surface. Thus there are no separate mechanical keys going into openings in a layer. This allows the provision of a keypad where dirt cannot enter between keys. The mounting process for a portable electronic device may be simplified because of this feature. It may be further possible to make the keypad waterproof, which enables the use of the device under water or allows the device to be accidentally dropped into water without being destroyed.

It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

The present invention will now be described in more detail in relation to the enclosed drawings, in which.

DETAILED DESCRIPTION OF EMBODIMENTS

Figure 1:
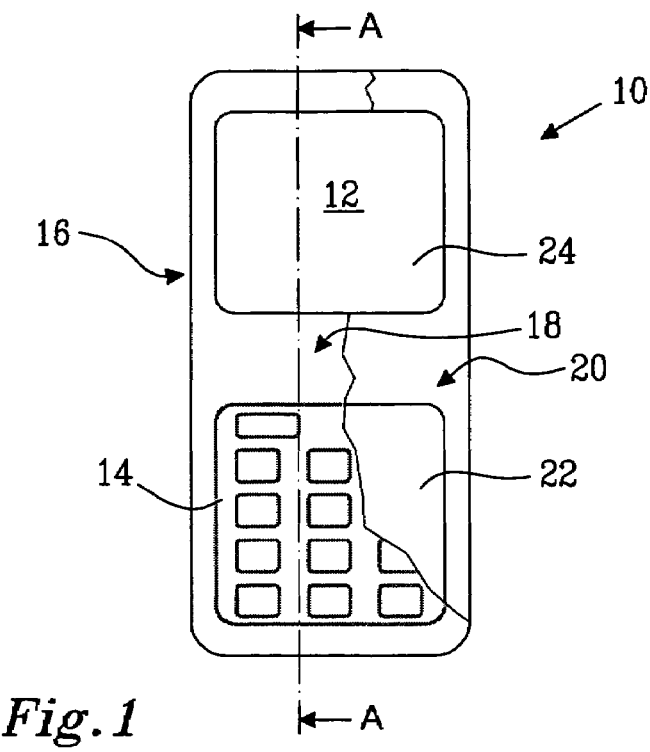
FIG. 1 schematically shows a top view of a cellular phone.

The present invention relates to a portable electronic device. In FIG. 1 there is shown a top view of such a portable electronic device in the form of a cellular phone 10. A cellular phone is just one example of a portable electronic device type with an ability to communicate. The invention is in no way limited to this type of device, but can be applied on other types of portable communication devices, for instance a smartphone and a communicator or other portable electronic devices like a lap top computer, a palm top computer, an electronic organizer or a gaming machine. The device is normally provided within a cover, of which a front cover 16 is shown in FIG. 1. The front cover is provided with a window 12 below which a display is provided and a keypad 14 comprising one or more input units in the form of keys that can be depressed by a user of the device. In the case of a cellular phone there are several such keys. There is normally also a back cover, which is not shown here.

The front cover 16 is here provided in the form of an IMF (In Mould Foil) structure, where a flexible plastic foil has been moulded to a stiff plastic material.

Figure 2:
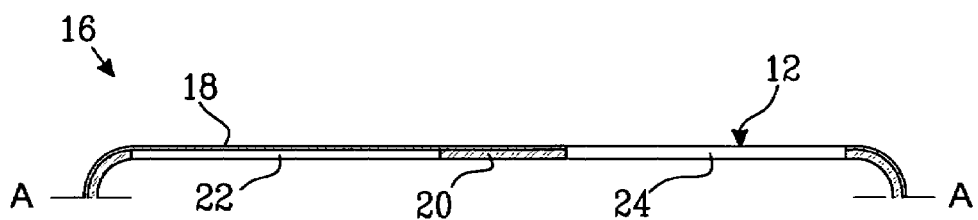
FIG. 2 schematically shows a cross-sectional view of a front cover for the cellular phone according to a first embodiment of the present invention, FIG. 3 schematically shows a cross-sectional view of a front cover for the cellular phone according to a second embodiment of the present invention, and FIG. 4 schematically shows a cross-sectional view of a front cover for the cellular phone according to a third embodiment of the present invention.

FIG. 2 shows a cross-sectional view of the front cover 16 according to a first embodiment of the present invention. The front cover 16 has a thin top layer 18 of 0.175 mm thick flexible plastic film which is bonded to a bottom layer 20 of 1.2 mm thick stiff plastic material. This structure is a so-called IMF structure (In Mould Foil) structure, which means that the two layers are moulded together. The bottom layer 20 is here intended to face inwards towards the interior of the phone, while the top layer 18 is intended to face outwards towards a user of the phone. The bottom layer 22 is furthermore provided with a first opening 22 and a second opening 24. The second opening 24 is provided for allowing a user to view a display (not shown) for this reason there is furthermore a window 12 of transparent plastic material provided above the second opening 24 and covering the display in order to protect it. The first opening 22 is provided in order to allow the provision of a keypad providing one or more input keys. According to the embodiment of the present invention the top layer covers all the plastic material of the bottom layer and also covers the first opening 22. This is done in order to allow the top layer of flexible film to allow user inputs as a keypad. Because of its flexible nature the film 18 can be depressed into the first opening 22 and there contact a key depression registering device for instance in the form of one or more domes or other conventional key depression registration mechanisms.

The invention according to this first embodiment has several advantages. It allows the provision of keys of a keypad on a solid surface. Thus there are no separate mechanical keys going into openings in a layer. This allows the provision of a keypad where dirt cannot enter between keys. The mounting process for a phone is furthermore much more simplified because of this feature. It is furthermore possible to make the keypad waterproof, which enables the use of the device under water or allows the device to be accidentally dropped into water without being destroyed. Because IMF materials are used another advantage is that information like symbols or graphical designs can easily be printed on them. They can be printed using photographic technique. Thus information specifying the use of a certain key is easy to provide on the cover according to the embodiment of the present invention. The surface is furthermore scratch resistant. Thus the surface is not scratched easily.

The top layer is here preferably a flexible plastic film of a material like polycarbonate, polyester or PET (Polyethylene Terephthalate) and may have a thickness in the range of 0.05-0.25 mm and preferably in the range of 0.07-0.20 mm. In the described embodiment it is 0.175 mm.

The bottom layer, which is of a stiff plastic material like ABS (Acrylonitrile, Butadiene, Styrene) or PC (Polycarbonate) may have a thickness in the range of 0.5-2.0 mm and preferably in the range of 1.0-1.5 mm. In the described embodiment it is 1.2 mm.

The top layer according to the first embodiment may, in the area covering the first opening, become slightly dented or embossed, which may give the surface of the phone a look which is undesirable from an aesthetic point of view. This may furthermore somewhat negatively influence the input of information using the keypad.

A second embodiment of the present invention is directed towards solving this/these problems.

Figure 3:
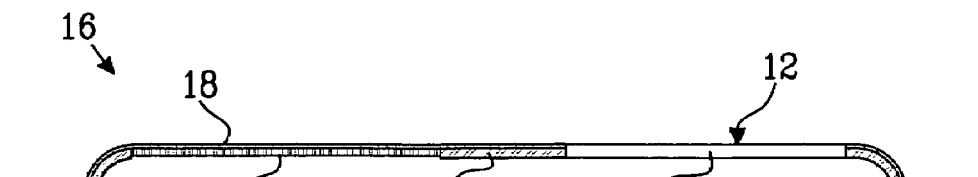

FIG. 3 shows a cross-sectional view of the front cover 16 according to the second embodiment of the present invention. In many respects this embodiment is identical to the first embodiment. The only difference is that in the first opening, below the top layer 18, there is provided a patch layer 26 of 0.4 mm thick flexible thermo elastic or silicon material. This patch layer 26 covers the whole first opening and is furthermore bonded to both the top layer 18 and the bottom layer 20. It may however be sufficient that it is only bonded to the top layer 18. The patch layer 26 has been produced in the same moulding process and thus it is moulded to both the top layer 18 and the bottom layer 20.

The provision of this patch layer 26 has shown to provide even surfaces, which thus provides a much more aesthetically pleasing cover. Because of this the key input process is also improved.

The patch layer is thus also flexible and is provided as a thermo elastic material for instance TPE (Thermo Plastic Elastomer) with a softener for providing the same flexibility as the IMF film. It may also be provided through silicone. The patch layer has a hardness in the range of Shore A 60-95 and has a thickness in the range of 0.3-1.0 mm, preferably in the range of 0.4-0.9 mm. In the described embodiments it is about 0.4 mm.

The combination of film 18 and patch layer 26 can be depressed into the first opening 22 and there contact a key depression registering device for instance in the form of one or more domes or other conventional key depression registration mechanisms. It should be realised that the patch layer may be provided with small protrusions arranged to act on a dome for making better contact with this dome for providing safer key input registration. One advantage of an embodiment of the present invention may be that the combination of patch layer and top layer allows the provision of an aesthetically pleasing flat outer surface presented to a user simultaneously with protrusions acting on a key depression registering device.

Figure 4:
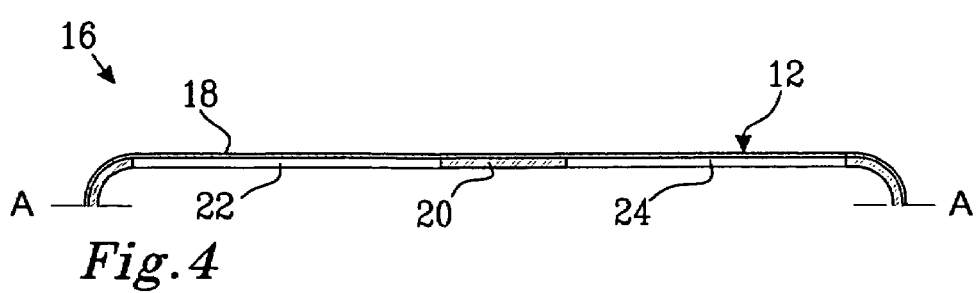

The teachings of the present invention are not limited to use with keypads. In order to provide a completely waterproof front cover it is possible to use the top layer 18 also for a display window. In this case this part of the IMF film has to be transparent. This is shown in FIG. 4, which is a variation of the first embodiment where there is no patch layer in the first opening 22. It should be realised that the use of the top layer 18 also for the display window can be combined with a patch layer in the first opening.

In the embodiments described above the front cover had a smooth flat surface where a keypad was provided. It should however be realised that the present invention is not limited to this. The area where the keypad is provided, and in fact the whole front cover may have any suitable shape. It is for instance possible to provide a number of raised areas in the keypad area of the top layer in order to provide a user the possibility to feel a key. Naturally the invention is not limited to a keypad but may be provided for as little as a single key.

In the field of cellular phones it has since a number of years been popular to use removable front covers or shells. It should be realised that the teachings of the present invention can also be used on such removable front covers or shells. For this and other reasons the present invention is only to be limited by the following claims.

What is claimed is:

1. Front cover for a portable electronic device comprising:
   a bottom layer of stiff plastic material comprising a first opening where at least one input key is to be provided,
   a top layer of flexible plastic film, said top layer covering said bottom layer including said first opening, wherein the top and bottom layers are bonded to each other, and
   a patch layer in said first opening adjacent the top layer, wherein an outer surface of the patch layer in said first opening is coplanar with an outer surface of the bottom layer, the top layer extends across the planar surface formed by the coplanar outer surfaces of the patch layer and the bottom layer, and wherein the patch layer comprises flexible thermo elastic or silicon material that is bonded at least to the top layer.

2. Front cover according to claim 1, wherein the top layer has a thickness in the range of 0.05-0.25 mm.

3. Front cover according to claim 1, wherein the bottom layer has a thickness in the range of 0.5-2.0 mm.

4. Front cover according to claim 1, wherein the patch layer has a thickness in the range of 0.3-1.0 mm.

5. Front cover according to claim 1, wherein the patch layer comprises protrusions extending in a direction away from the top layer.

6. Front cover according to claim 1, wherein all layers have been moulded to each other.

7. Front cover according to claim 1, wherein the bottom layer comprises a second opening where a display is to be provided and the top layer covers also said second opening.

8. Front cover according to claim 1, wherein the bottom layer has a thickness in a range of 1.0-1.5 mm.

9. Front cover according to claim 1, wherein the patch layer has a thickness in a range of 0.4-0.9 mm.

10. Portable electronic device with a front cover, said front cover comprising:
    a bottom layer of stiff plastic material comprising a first opening where at least one key is to be provided, and
    a top layer of flexible plastic film, said top layer covering said bottom layer including said first opening, wherein the top and bottom layers are bonded to each other, and
    a patch layer in said first opening adjacent the top layer, wherein an outer surface of the patch layer in said first opening is coplanar with an outer surface of the bottom layer, and the top layer extends across the planar surface formed by the coplanar outer surfaces of the patch layer and the bottom layer, wherein the patch layer comprises flexible thermo elastic or silicon material that is bonded at least to the top layer.

11. Portable electronic device according to claim 10, wherein the top layer has a thickness in the range of 0.05-0.25 mm.

12. Portable electronic device according to claim 10, wherein the bottom layer has a thickness in the range of 0.5-2.0 mm.

13. Portable electronic device according to claim 10, wherein the patch layer has a thickness in the range of 0.3-1.0 mm.

14. Portable electronic device according to claim 10, wherein the patch layer comprises protrusions extending in a direction away from the top layer.

15. Portable electronic device according to claim 10, wherein all layers have been moulded to each other.

16. Portable electronic device according to claim 10, wherein the bottom layer comprises a second opening where a display is to be provided and the top layer covers also said second opening.

17. Portable electronic device according to claim 10, wherein the portable electronic device comprises a portable communication device.

18. Portable communication device according to claim 17, wherein the portable electronic device comprises a cellular phone.

19. Portable electronic device according to claim 10, wherein the bottom layer has a thickness in a range of 1.0-1.5 mm.

20. Portable electronic device according to claim 10, wherein the patch layer has a thickness in a range of 0.4-0.9 mm.

* * * * *